(12) United States Patent
Gibson et al.

(10) Patent No.: US 7,722,027 B2
(45) Date of Patent: May 25, 2010

(54) VACUUM BELT CONVEYOR

(75) Inventors: Peter William Gibson, Maple Ridge (CA); Michael Poropat, Surrey (CA)

(73) Assignee: Raute Oyj, Nastola (FI)

( * ) Notice: Subject to any disclaimer, the term of this patent is extended or adjusted under 35 U.S.C. 154(b) by 239 days.

(21) Appl. No.: 11/984,302

(22) Filed: Nov. 15, 2007

(65) Prior Publication Data
US 2009/0057102 A1 Mar. 5, 2009

(30) Foreign Application Priority Data
Aug. 29, 2007 (FI) .................................. 20070655

(51) Int. Cl.
*B65H 5/08* (2006.01)
(52) U.S. Cl. ........................................ 271/12; 198/811
(58) Field of Classification Search ................... 271/12, 271/92, 93; 198/689.1, 803.5, 811, 867.03, 198/955; 414/797
See application file for complete search history.

(56) References Cited
U.S. PATENT DOCUMENTS

| | | | |
|---|---|---|---|
| 2,813,637 A * | 11/1957 | Perry et al. ............... 414/791.1 |
| 3,193,282 A * | 7/1965 | Stewart ....................... 271/12 |
| 3,737,034 A * | 6/1973 | Icard ........................... 209/521 |
| 3,830,489 A * | 8/1974 | Adams ...................... 271/9.12 |
| 4,620,826 A * | 11/1986 | Rubio et al. ............ 414/793.1 |
| 4,637,599 A * | 1/1987 | Eerola ........................... 271/5 |
| 5,090,676 A * | 2/1992 | Matsuno et al. ............... 271/12 |
| 5,232,213 A * | 8/1993 | Parsons et al. ................. 271/95 |
| 5,527,027 A * | 6/1996 | Flade et al. .................... 271/94 |
| 7,007,942 B1 * | 3/2006 | Stearns et al. ................. 271/11 |

\* cited by examiner

*Primary Examiner*—Douglas A Hess
(74) *Attorney, Agent, or Firm*—Buchanan Ingersoll & Rooney PC

(57) ABSTRACT

The invention concerns a vacuum belt conveyor for transferring veneer sheets under a vacuum effect. The conveyor consists of a vacuum box under a vacuum effect, having at least one perforation extending lane-like in the direction of conveyance of the conveyor. Conveying belts are running on both sides of the perforation. The belts are brought into contact with a veneer sheet to be transferred, whereby the veneer sheet and the belts line an underpessurized space, and the sheet is retained in contact with the belts. A lug movable in the direction of the vacuum lane is arranged at the perforation for keeping any jamming debris away.

13 Claims, 6 Drawing Sheets

VACUUM BELT CONVEYOR

BACKGROUND

1. Field

Disclosed herein is a vacuum belt conveyor for transferring veneer sheets.

2. Description of Related Art

The basic structure of the vacuum belt conveyor is conventional, i.e. it consists of an elongated box structure whose interior can be brought under a vacuum effect. At least one lane-like perforation extends along the bottom of the box through which the bottom area of the box can be brought under the vacuum effect prevailing inside the case. The lane is bounded by a conveyor belt running at its both edges in dragging contact with the lower surface of the vacuum box. The product to be conveyed, such as a veneer sheet, is brought, at its upper surface, under the vacuum effect through the openings, the sheet thus being moved by the belts to the intended place where it is released from the vacuum effect by stamping by means of kicker arms provided in the conveyor.

Vacuum belt conveyors have been used to transfer veneer sheets, among other things, even as embodiments in which the veneer sheet lies on the conveyor. A vacuum inside the conveyor affects the lower surface of the veneer sheet holding the sheet pressed against the belts that convey the sheet. Even in these embodiments the belt are placed adjacent to a vacuum area to bound the vacuum area.

The problem with these conveyors has been, particularly when applied to the conveyance of veneer sheets, that different kinds of pieces of sheet end up in the perforation and remain there interfering with the vacuum effect. The perforations must be cleaned at regular intervals, in which operation the usual practice is to stop the devices creating the vacuum in the box. This results in an immediate interruption in the production.

SUMMARY

An improvement has now been achieved to the problems by certain embodiments of the vacuum belt conveyor described herein, having arranged at the perforation a lug movable in the direction of the lane and in contact with the perforation.

More specifically, disclosed herein is a vacuum belt conveyor for transferring veneer sheets under a vacuum effect, comprising: an elongated vacuum box comprising: a first surface having at least one perforation lane extending in a longitudinal direction thereof; a mechanism that produces a vacuum effect inside the elongated vacuum box; a first and second conveying belts, each extending in the longitudinal direction of the elongated vacuum box arranged to run externally on said first surface on either side of the perforation lane in a circling loop; and a lug, movable in the longitudinal direction of the perforation lane disposed in the perforation lane and protruding sufficiently from the lower surface of the elongated vacuum box to push scrap to an area where the vacuum effect does not reach, but not sufficiently to interfere with movement of a veneer sheet by said conveying belts.

BRIEF DESCRIPTION OF DRAWINGS

The vacuum belt conveyor disclosed herein will be explained in more detail with reference to the non-limiting accompanying drawing in which.

DETAILED DESCRIPTION OF THE DRAWINGS

Figure 1:
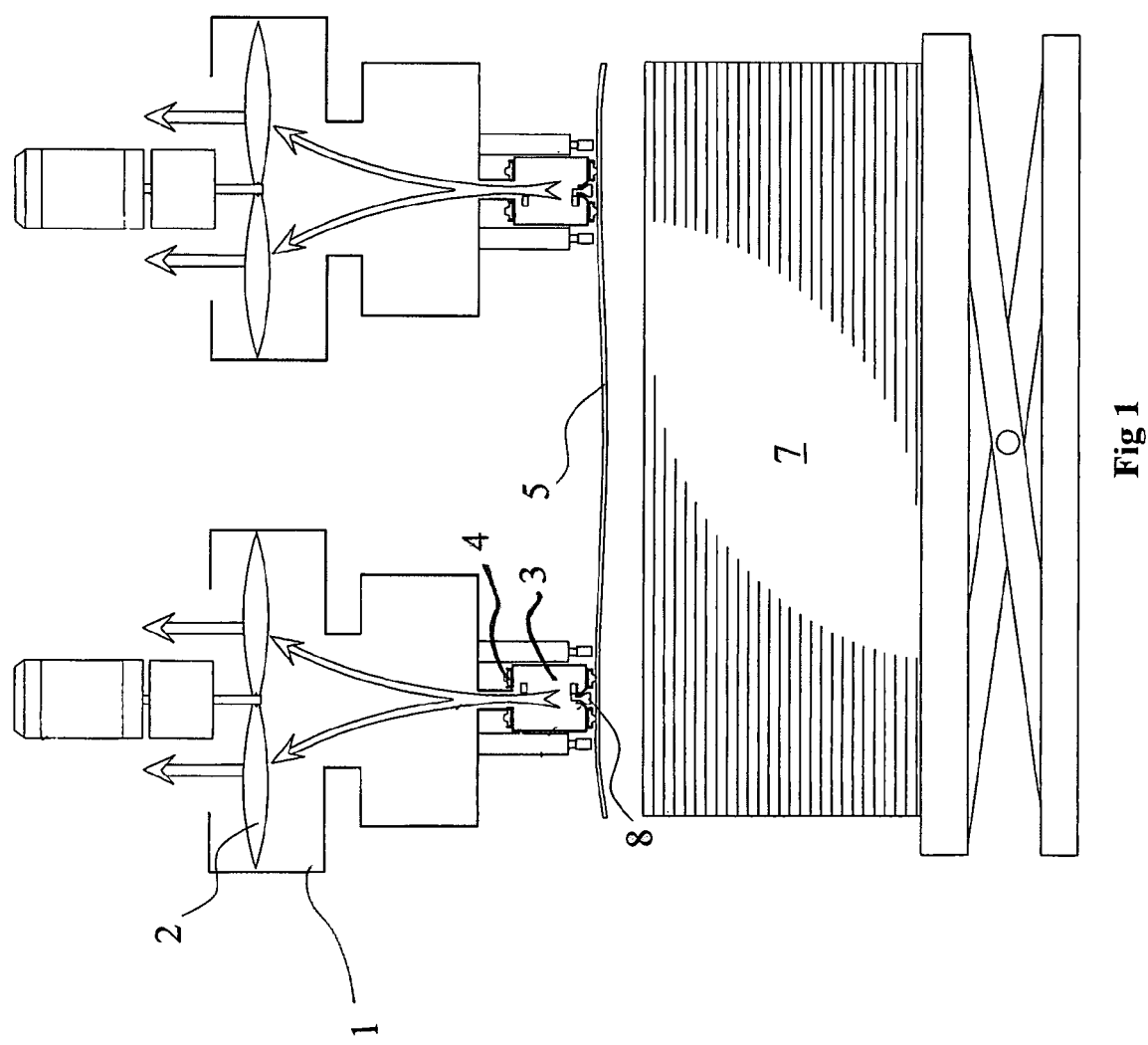
FIG. 1 is schematic diagram which shows an embodiment of the vacuum belt conveyor described herein, applied to the stacking of veneer sheets, seen in the direction of conveyance of the veneer sheets.
Figure 2:
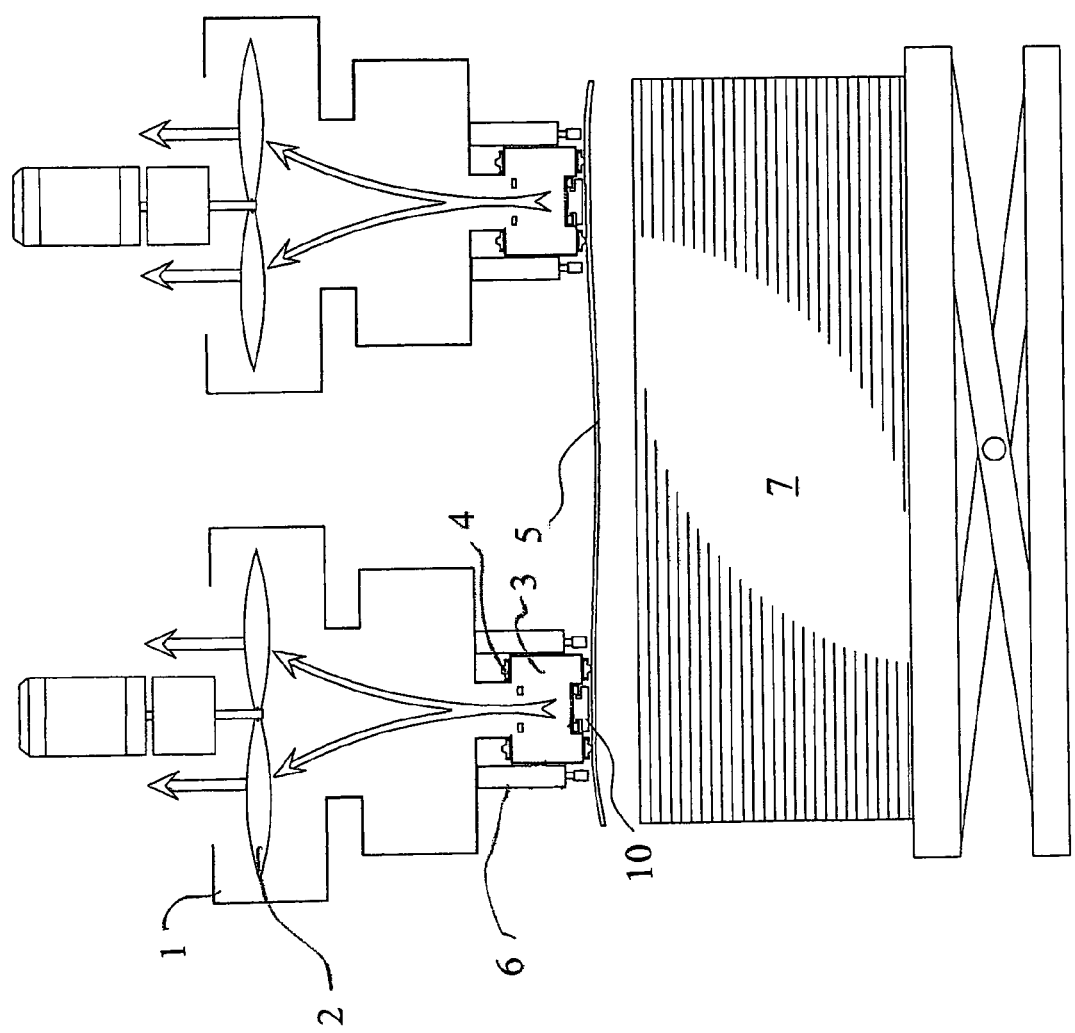
FIG. 2 is schematic diagram which shows another embodiment of the vacuum belt conveyor described herein, applied to the stacking of veneer sheets as well, seen in the direction of conveyance of the veneer sheets.
Figure 3:
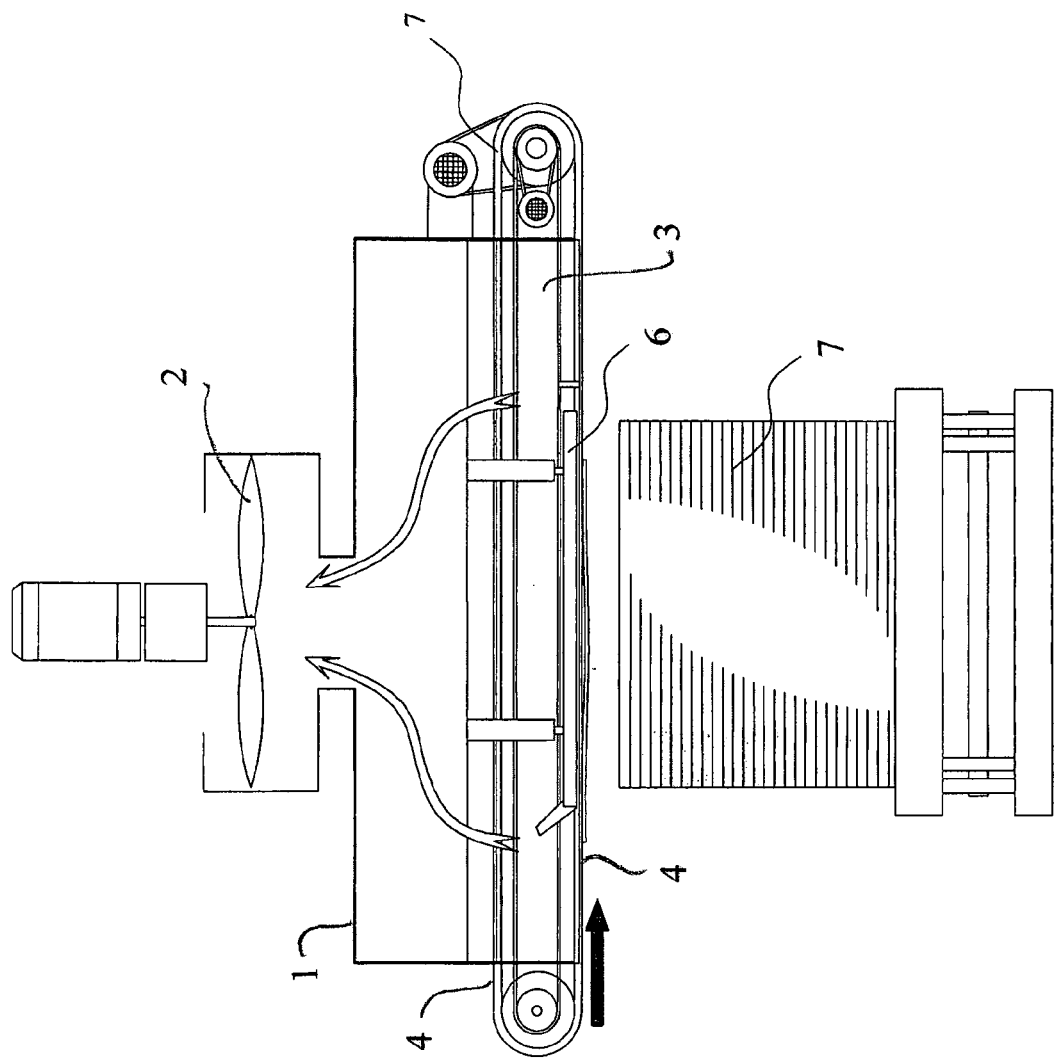
FIG. 3 is schematic diagram which shows a stacking embodiment of the vacuum belt conveyor described herein, seen transversely to the direction of conveyance of the veneer sheets.

As used herein, the terms "vacuum lane" and "perforation lane" are synonymous. FIGS. 1 to 3 show a vacuum belt conveyor apparatus having a basic structure as described herein, applied to the conveyance of veneer sheets, with the sheets hanging from the conveyor. The vacuum box 1 forms a base for the apparatus. The vacuum box 1 is provided with a blower 2 by means of which a vacuum can be maintained in the vacuum box 1 relative to the ambient pressure. The lower part of the vacuum box 1 is formed into a conveyor box 3 having a vacuum connection with the vacuum box 1. The lower surface of the conveyor box 3 comprises a slot, or alternatively a line of punched holes or openings, extending in the longitudinal direction of the box, substantially over the length of the box.

The conveyor box 3 is arranged surrounded by two belts 4 formed into loops. These belts 4 move in dragging contact with at least the lower surface of the conveyor box 3, one on each side of the vacuum slot or the line of vacuum openings. When the lower side of the conveyor box 3 is brought into contact with the upper surface of a veneer sheet 5, it closes the vacuum slot or the line of vacuum openings of the conveyor box 3. The veneer sheet is kept suspended against the belts and travels to the intended place of delivery therewith. There are kicker arms 6 on two sides of the conveyor box 3 by means of which the veneer sheet 5, can be released by kicking it off from the belts 4 and breaking the vacuum effect that holds the veneer sheet 5 up. The veneer sheet 5 can be put into the intended place, such onto a veneer sheet stack, using this kicker function.

Usually, there are two similar vacuum belt conveyors parallel to each other, as shown in the exemplary FIGS. 1 and 2. A vacuum belt conveyor can also be embodied with one box, in which case the conveyor belts may lie farther away from one another and have several parallel vacuum slots or rows of vacuum holes therebetween. Such a one-box structure is suitable for conveying stiff veneer. The length of the vacuum belt conveyors is adjusted according to the current necessary conveyance distance, which is shown as a mainly schematic illustrative presentation in the views of the accompanying drawings.

Figure 4:
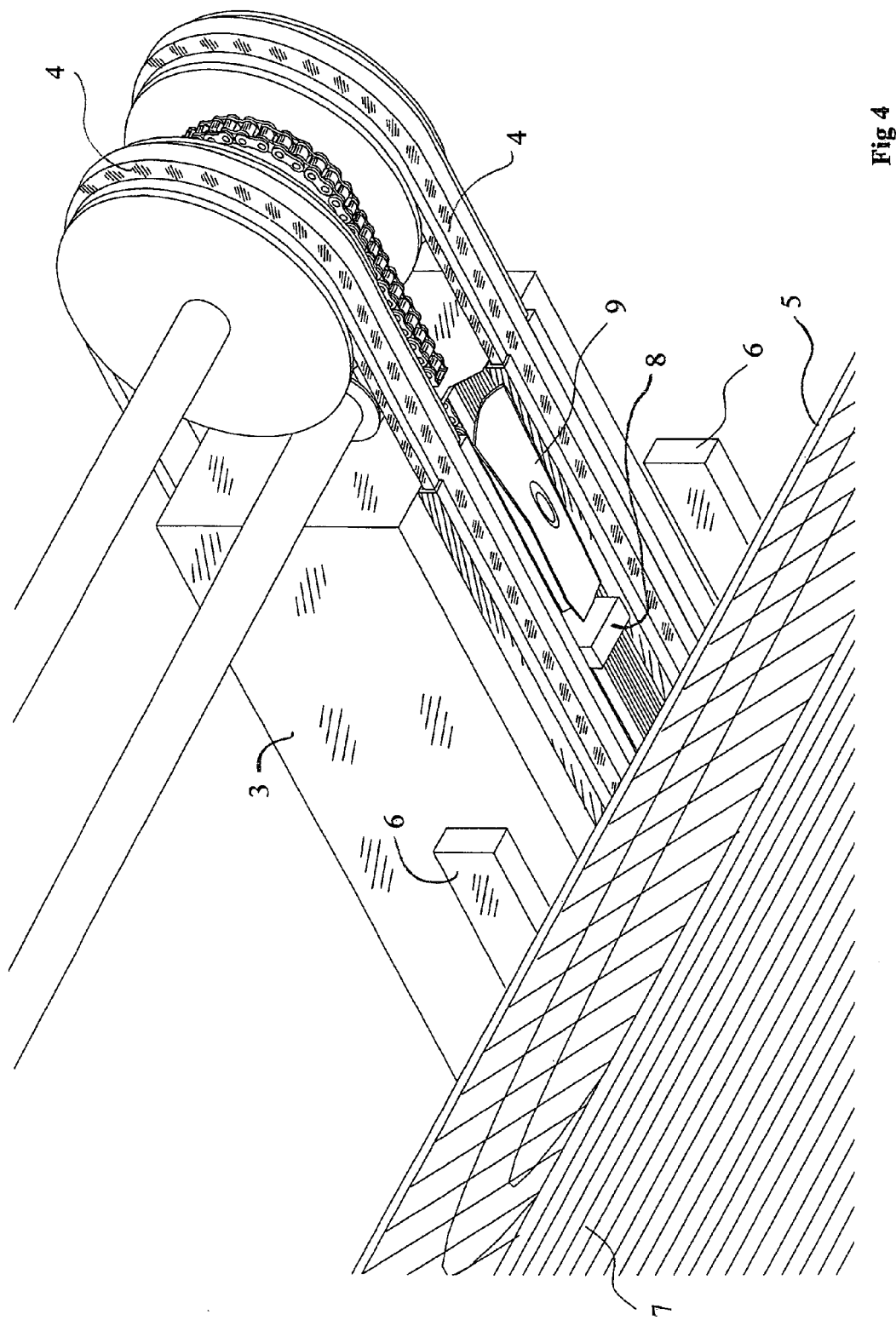
FIG. 4 is schematic diagram which shows a detail of the embodiment of the vacuum belt conveyor according to FIG. 1.
Figure 5:
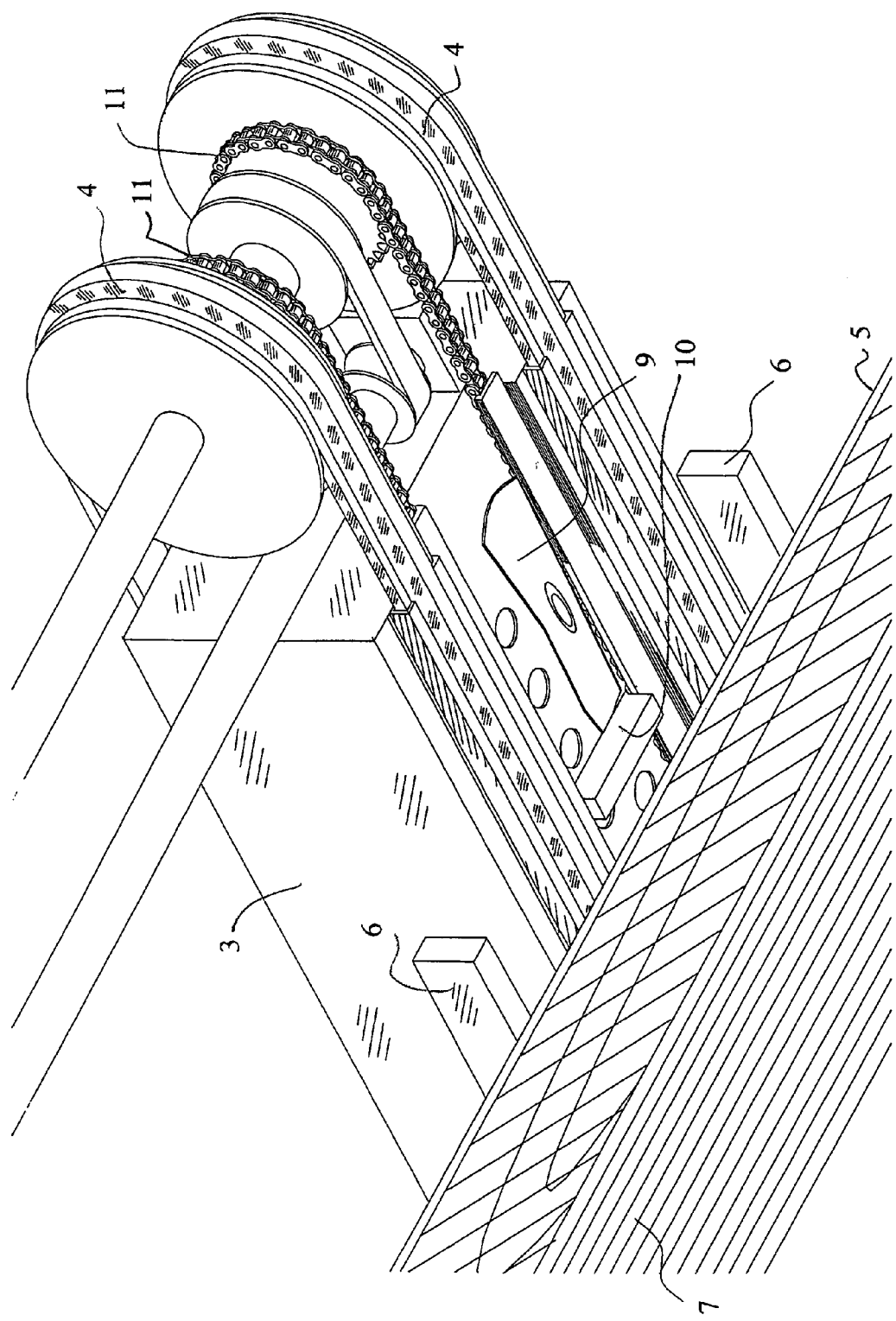
FIG. 5 is schematic diagram which shows a detail of the embodiment of the vacuum belt conveyor according to FIG. 2.
Figure 6:
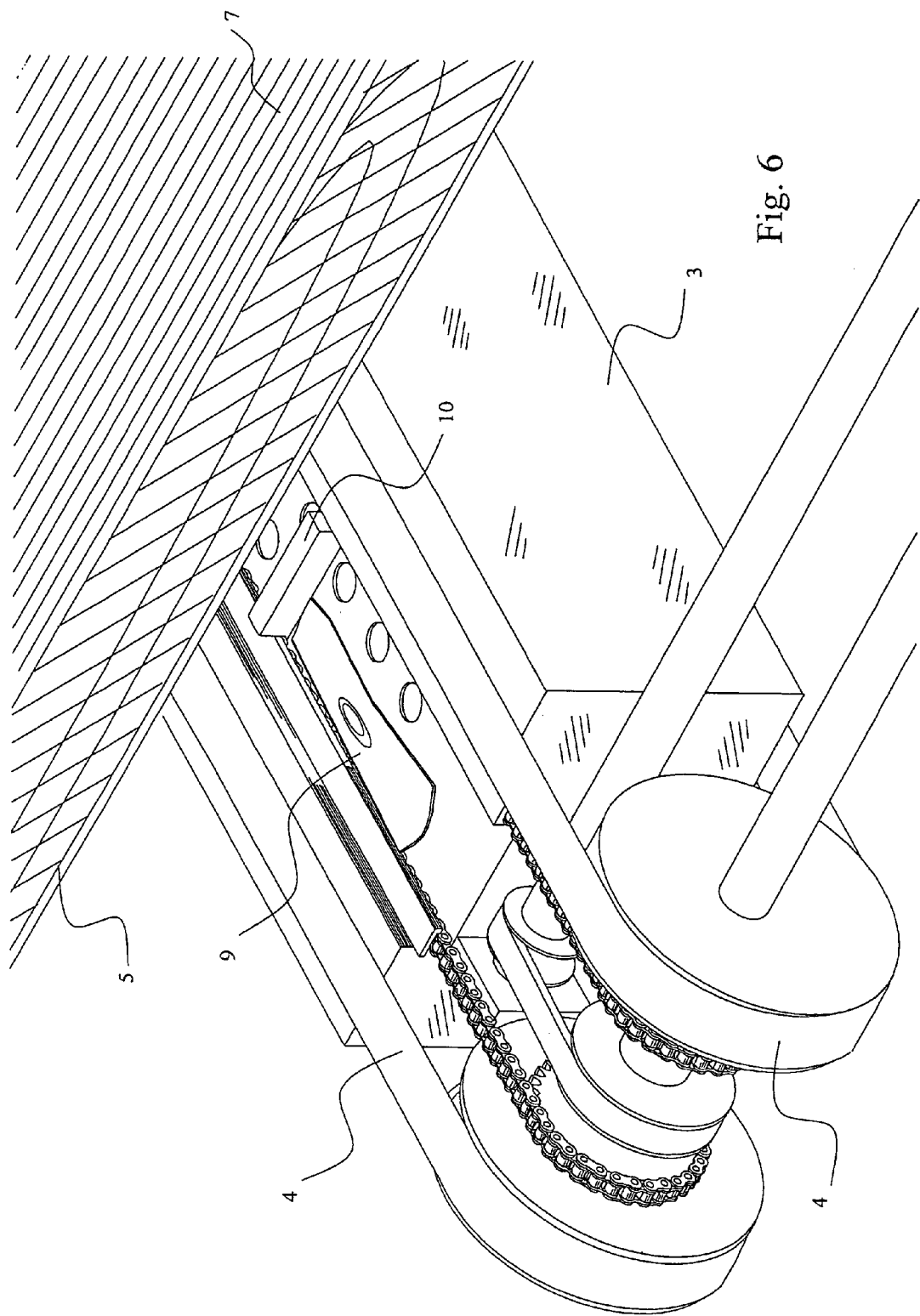
FIG. 6 is schematic diagram which shows an embodiment of the vacuum belt conveyor described herein as a conveyor in which the veneer sheets are conveyed on top of the conveyor.

FIG. 6 shows a conveyor structure that is principally the same as in FIGS. 1 to 5 but intended to convey the veneer sheets supported on top of the conveyor. To keep the veneer sheets under the control of the conveyor, the structure of the conveyor is embodied principally in the same way as explained above in the case of conveyors in which the veneer sheets hang from the conveyor. The apparatus can be used, for example, to unload sheets from a veneer sheet stack from below.

Conventional vacuum belt conveyors generally work without problems when the material to be conveyed is unbroken. When conveying veneer, problems can be caused by the veneer debris or small size veneer pieces which inevitably end up in the working area of the vacuum belt conveyors along with the whole veneer sheets. These small-sized veneer pieces often settle in the vacuum slot or in the area of the vacuum openings, between the conveyor belts 4. In this space, they obstruct their own area as regards the vacuum effect but do not get under the influence of the kicker arms, for example so that they are not ejected from the machine by the kicker arms. The blockage caused must be gotten rid of, and this usually requires an interruption in the operation of the conveyor because the harmful pieces cannot generally be removed properly unless the vacuum apparatus is stopped.

An improvement has now been achieved which reduces or eliminates this problem in embodiments of the vacuum belt conveyor described herein. The basic structure of the vacuum belt conveyor is as described above, i.e. consists of a vacuum box under a vacuum effect, having at least one perforation extending lane-like in the direction of conveyance of the conveyor, as well as conveyor belts running on both sides of the perforation and lining it. The vacuum belt conveyor according to the embodiments described herein has a lug movable in the direction of the vacuum lane arranged at the perforation.

FIG. 4 shows a part of the end of an embodiment a vacuum belt conveyor described herein. In this embodiment, the vacuum lane is implemented in the form of a vacuum slot extending between the conveyor belts 4, in the same direction as them. A lug 8 is placed in this vacuum slot. The lug 8 is designed to stay in the vacuum slot by its shape and to be movable back and forth along the length of the vacuum slot. To generate this back-and-forth motion, an appropriate drive, such as a cable or chain drive, is placed in the conveyor box part 3. Preferably, the lug 8 protrudes from the lower surface of the conveyor box 3 less than the conveyor belts 4, whereby the lug 8 does not interfere with the movement of the veneer sheet suspended below the conveyor belts 4. The lug 8 pushes the scrap 9, such as a piece of veneer, that has became trapped in vacuum slot, to an area which the vacuum effect does not reach, so that the scrap thus falls out of the apparatus. The lug 8 can also be arranged to follow a circling path inside the conveyor box 3, it then being necessary to create appropriate passageways for the lug 8 at the end and beginning of the vacuum slot, respectively.

FIGS. 5 and 6 illustrate an alternative embodiment of the vacuum belt conveyor described herein. In this embodiment, the vacuum lane of the conveyor box 3 is implemented in the form of punched holes which lie in two lines between the conveyor belts 4. In this embodiment, the lug 10 is located on the surface of the conveyor box 3, moves along the vacuum lane and wipes the scrap 9 from the surface of the vacuum lane. The lug 10 may be fixed to the conveyor belts 4 and travel around the conveyor box 3 together with them. The embodiment requires such an embodiment of the vacuum box in which the connection to the conveyor box 3 is implemented in another way than in FIGS. 1 to 3. In addition, the lug 10 may have its own drive, such as a cable or chain drive 11, producing a back-and-forth driving motion along the vacuum area, or a circling path of motion, having the returning motion arranged inside the conveyor box 3, through passageways provided in its ends. In the reciprocating driving motion, its must be considered how much the lug may protrude relative to conveyor belts.

The invention having been described by reference to certain drawings and specific embodiments, it will be understood that these are illustrative of, and not limiting of, the appended claims.

The invention claimed is:

1. A vacuum belt conveyor for transferring veneer sheets under a vacuum effect, comprising:
   an elongated vacuum box comprising:
      a first surface having at least one perforation lane extending in a longitudinal direction thereof;
      a mechanism that produces a vacuum effect inside the elongated vacuum box;
   a first and second conveying belts, each extending in the longitudinal direction of the elongated vacuum box arranged to run externally on said first surface on either side of the perforation lane in a circling loop; and
   a lug, movable in the longitudinal direction of the perforation lane disposed in the perforation lane and protruding sufficiently from the lower surface of the elongated vacuum box to push scrap to an area where the vacuum effect does not reach, but not sufficiently to interfere with movement of a veneer sheet by said conveying belts.

2. A vacuum belt conveyor as defined in claim 1, wherein said perforation lane comprises a slot, and wherein the lug is disposed in the slot and is retained in the slot by its shape.

3. A vacuum belt conveyor as defined in claim 2, wherein the lug is capable of moving back and forth in the perforation lane.

4. A vacuum belt conveyor as defined in claim 2, wherein the lug is capable of moving along a circling path that includes the perforation lane.

5. A vacuum belt conveyor as defined in claim 1, wherein said perforation lane comprises one or more rows of separate holes in the first surface of the box, and wherein the lug is disposed across the holes externally in close contact with said first surface of the box.

6. A vacuum belt conveyor as defined in claim 5, wherein the lug is capable of moving back and forth in the perforation lane.

7. A vacuum belt conveyor as defined in claim 5, wherein the lug is capable of moving along a circling path that includes the perforation lane.

8. A vacuum belt conveyor as defined in claim 1, wherein the lug is capable of moving back and forth in the perforation lane.

9. A vacuum belt conveyor as defined in claim 1, wherein the lug is capable of moving along a circling path that includes the perforation lane.

10. A vacuum belt conveyor as defined in claim 1, further comprising:
    a first drive mechanism for moving said conveying belts.

11. A vacuum belt conveyor as defined in claim 10, wherein the first drive mechanism also moves the lug.

12. A vacuum belt conveyor as defined in claim 10, further comprising a second drive mechanism for moving said lug.

13. A vacuum belt conveyor as defined in claim 1, further comprising a drive mechanism for moving said lug.

* * * * *